US008576760B2

(12) United States Patent
Gorokhov et al.

(10) Patent No.: US 8,576,760 B2
(45) Date of Patent: Nov. 5, 2013

(54) APPARATUS AND METHODS FOR CONTROLLING AN IDLE MODE IN A WIRELESS DEVICE

(75) Inventors: Alexei Y. Gorokhov, San Diego, CA (US); Ravi Palanki, San Diego, CA (US); Tamer A. Kadous, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 12/557,407

(22) Filed: Sep. 10, 2009

(65) Prior Publication Data

US 2010/0067421 A1    Mar. 18, 2010

Related U.S. Application Data

(60) Provisional application No. 61/096,718, filed on Sep. 12, 2008.

(51) Int. Cl.
*G08C 17/00* (2006.01)

(52) U.S. Cl.
USPC .......................................... 370/311; 370/468

(58) Field of Classification Search
USPC ......... 370/311, 328–330, 335–336, 342–343, 370/345, 436–437, 441–442, 449–450, 454, 370/458–459, 465, 468
See application file for complete search history.

(56) References Cited

U.S. PATENT DOCUMENTS

| 6,111,927 | A | 8/2000 | Sokoler |
| 6,917,598 | B1 * | 7/2005 | Emeott et al. ................. 370/311 |
| 7,020,102 | B2 * | 3/2006 | Tuomainen et al. .......... 370/311 |
| 7,215,924 | B2 * | 5/2007 | Palermo et al. .............. 455/41.1 |
| 7,570,952 | B2 * | 8/2009 | Woxberg et al. .............. 455/450 |
| 7,580,384 | B2 * | 8/2009 | Kubler et al. ................. 370/328 |

(Continued)

FOREIGN PATENT DOCUMENTS

| CN | 1689346 A | 10/2005 |
| CN | 1934829 A | 3/2007 |

(Continued)

OTHER PUBLICATIONS

International Search Report & Written Opinion—PCT/US2009/056745, International Search Authority—European Patent Office—Mar. 24, 2010.

(Continued)

*Primary Examiner* — Kevin Mew
(74) *Attorney, Agent, or Firm* — John J. Ketchum (57) ABSTRACT

Apparatus and methods are disclosed for control of an idle mode in a wireless device. In particular, the idle mode duty cycle of a preamble transmission by an access point (AP), as an example, is variably or adaptively set in response to determined conditions of the wireless neighborhood. The conditions determined include the whether or not other wireless devices are present in the vicinity of sensing wireless device, as well as the state of those devices present, such as whether they are in an idle mode or an active mode.

62 Claims, 6 Drawing Sheets

(56) References Cited

U.S. PATENT DOCUMENTS

| | | |
|---|---|---|
| 7,720,479 B2* | 5/2010 | Laroia et al. .............. 455/436 |
| 7,733,818 B2* | 6/2010 | Twitchell, Jr. ............. 370/311 |
| 7,924,783 B1* | 4/2011 | Mahany et al. ............. 370/330 |
| 2001/0007151 A1 | 7/2001 | Vorenkamp et al. |
| 2002/0132603 A1* | 9/2002 | Lindskog et al. .......... 455/343 |
| 2003/0016702 A1 | 1/2003 | Bender et al. |
| 2003/0048153 A1 | 3/2003 | Liang et al. |
| 2006/0140218 A1 | 6/2006 | Winterton |
| 2007/0197190 A1* | 8/2007 | Tang ........................... 455/410 |
| 2008/0204216 A1 | 8/2008 | Masudaya |
| 2009/0040954 A1 | 2/2009 | Usuba |
| 2009/0275302 A1 | 11/2009 | Huston et al. |
| 2010/0067422 A1 | 3/2010 | Kadous et al. |
| 2010/0260087 A1* | 10/2010 | Twitchell, Jr. ............. 370/311 |
| 2011/0067083 A1 | 3/2011 | Vorenkamp et al. |
| 2012/0087290 A1* | 4/2012 | Rhee et al. ................. 370/311 |

FOREIGN PATENT DOCUMENTS

| | | |
|---|---|---|
| EP | 0445887 A2 | 9/1991 |
| EP | 1551134 A1 | 7/2005 |
| KR | 20070086545 A | 8/2007 |
| WO | WO02071342 A1 | 9/2002 |
| WO | WO2005091013 | 9/2005 |
| WO | WO2006088135 | 8/2006 |

OTHER PUBLICATIONS

International Search Report and Written Opinion—PCT/US09/056737, International Search Authority—European Patent Office—Dec. 29, 2009.

Taiwan Search Report—TW098130783—TIPO—Mar. 3, 2013.

* cited by examiner

APPARATUS AND METHODS FOR CONTROLLING AN IDLE MODE IN A WIRELESS DEVICE

CLAIM OF PRIORITY UNDER 35 U.S.C. §119

The present application for patent claims priority to Provisional Application No. 61/096,718 entitled "IDLE MODE OPERATION FOR ACCESS POINTS AND RELAYS" filed Sep. 12, 2008, and assigned to the assignee hereof and hereby expressly incorporated by reference herein.

REFERENCE TO CO-PENDING APPLICATIONS FOR PATENT

The present application for patent is related to the following co-pending U.S. patent applications:

"APPARATUS AND METHODS FOR CONTROLLING A SLEEP MODE IN A WIRELESS DEVICE" by Kohlmann et al., Ser. No. 12/557,414, filed concurrently herewith, assigned to the assignee hereof, and expressly incorporated by reference herein.

BACKGROUND

1. Field

The present disclosure relates generally apparatus and methods for controlling idle mode in a wireless device, and more specifically to controlling access point or relay idle mode through controlled variation of the wake up duty cycles of the wireless device.

2. Background

Wireless communication deployment models are currently emerging where coverage and high capacity is enabled via dense networks of low-cost nodes. These nodes may be either wired access points (APs) or wireless relay stations (RS). Cost efficiency of such deployments is achieved not only due to low device cost but, more importantly, due to reduction in the costs of site acquisition, rental and maintenance. In this context, enabling cordless or non-wired RSs with an alternative source of power, such as through using a solar power source, has been proved efficient in some deployment scenarios. Alternatively, deploying an AP without an alternative power supply which is otherwise required to ensure robustness to power outages also yields a substantial reduction in the deployment cost. In both cases, the ability of an AP or RS to substantially reduce its power consumption during inactivity or idle periods is desirable.

Various forms of power saving operations such as sleep and idle modes are known for nodes in IEEE Std. 802.11, and in portable devices cellular wireless standards to improve battery life of user equipment (UE), access terminals (AT), or other portable devices. Looking first at the former example, the concept of power efficient operation for network nodes is known in IEEE Std. 802.11 to enable power efficient forwarding in a mesh Wi-Fi network. The known power save (PS) mode supported in 802.11 can be seen as a form of active sleep mode where a wireless node stays on at a predefined regular schedule to receive, transmit and/or forward traffic. The 802.11 PS form of power save can potentially apply to any node and facilitates mesh operation where battery powered devices can be used to forward traffic, and thus could conceivably be applied to cellular APs and RSs (or ATs in peer-to-peer mode). It is noted, however, that PS mode is an example of an active sleep mode, and its duty cycle when active is noticeably larger compared to the duty cycle of idle mode of cellular systems and thus would not offer significant power savings.

In wireless cellular systems, user equipment (UE), ATs, or other portable equipment feature power save operations are "idle mode" and various forms of active "sleep mode." In an optimized idle mode, for example, an average duty cycle of AT activity is typically within a fraction of a percent of the normal duty cycle. An AT in idle mode wakes up periodically to monitor paging channel, track a potential serving AP as well as candidate serving APs and eventually switch the candidate serving AP (i.e. perform idle handoff) and register in the case of paging zone change. Additional operations may include updating AP parameters as needed to perform initial access etc. A regular wake-up cycle is usually tied to the paging cycle which takes values between approximately 500 ms and a few seconds depending on device type and anticipated application. Idle mode design in cellular systems assumes that APs are always active and provide regular pilot transmission with a fixed periodicity of tens of milliseconds or less as well as opportunity for access or hand-in of an AT. While this assumption may substantially facilitate idle mode design at the AT, it prevents power efficient operation of APs.

Application of the above-discussed idle or sleep modes to node devices such as serving APs, RSs or even serving ATs in a peer-to-peer situation, however, is not known and strict application of known techniques to APs or RSs would not result in efficient and significant power savings, nor even be able to provide operation consistent with requirements of the AP or RS. Accordingly, it would be beneficial to provide techniques to achieve an efficient implementation of idle mode operations in an AP or RS (or AT operating as serving equipment in a peer-to-peer mode) to engender power savings.

SUMMARY

In an aspect, a method for controlling an idle mode in a wireless device is disclosed. The method includes determining neighborhood conditions of the wireless device. Furthermore, the method includes adaptively setting an idle mode duty cycle used for at least preamble transmission by the wireless device responsive to the determined neighborhood conditions.

In another aspect, an apparatus for controlling an idle mode in a wireless device is disclosed. The apparatus includes means for determining neighborhood conditions of the wireless device. Additionally, the apparatus includes means for adaptively setting an idle mode duty cycle used for at least preamble transmission by the wireless device responsive to the determined neighborhood conditions.

In yet another aspect, an apparatus for controlling an idle mode in a wireless device is disclosed. The apparatus features at least one processor configured to determine neighborhood conditions of the wireless device. Further, the at least one processor is also configured to adaptively set an idle mode duty cycle used for at least preamble transmission by the wireless device responsive to the determined neighborhood conditions; and a memory configured to store instructions executable by the at least one processor.

In still one more aspect, a computer program product comprising computer-readable medium is disclosed. The medium includes code for causing a computer to determine neighborhood conditions of a wireless device. The medium also includes code for causing a computer to adaptively set an idle mode duty cycle used for at least preamble transmission by the wireless device responsive to the determined neighborhood conditions.

DETAILED DESCRIPTION

The presently disclosed methods and apparatus provide power efficient idle mode operation in wireless devices such as access points (APs), relay stations (RSs), and even ATs operating in a peer-to-peer network. In particular, the present disclosure teaches adaptive setting of the duty cycle for idle mode operation of a wireless device that is tailored to neighborhood conditions, such as the presence and state of other wireless devices in the vicinity or neighborhood of the wireless device. By adaptively setting or varying the duty cycle based on the neighborhood conditions, the most efficient idle mode power usage possible for given conditions can be obtained.

The techniques described herein may be used for various wireless communication networks including cellular networks with microcells or 3G micro-networks. The networks may be configured as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (WiMax), IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). The techniques described herein may also be applied in future technologies such as International Mobile Telecommunications-Advanced (IMT Advanced), better known as 4G, or any other technology present or future that may employ mesh networks, microcell or micro networks, femtocell networks, picocell networks, peer-to-peer, or other similar schemes.

Although the terminology used herein to describe the disclosed methods and apparatus refers to access points (APs) and relay stations (RSs), these terms are understood to include base station, NodeB, evolved Node B (eNodeB or eNB)), repeaters, or equivalent devices. Further, the term access terminal (AT) as used herein is understood to encompass devices described by terms such as User Equipment (UE), mobile device, terminal, wireless communication device, Subscriber Station (SS), or other equivalent terminology.

Figure 1:
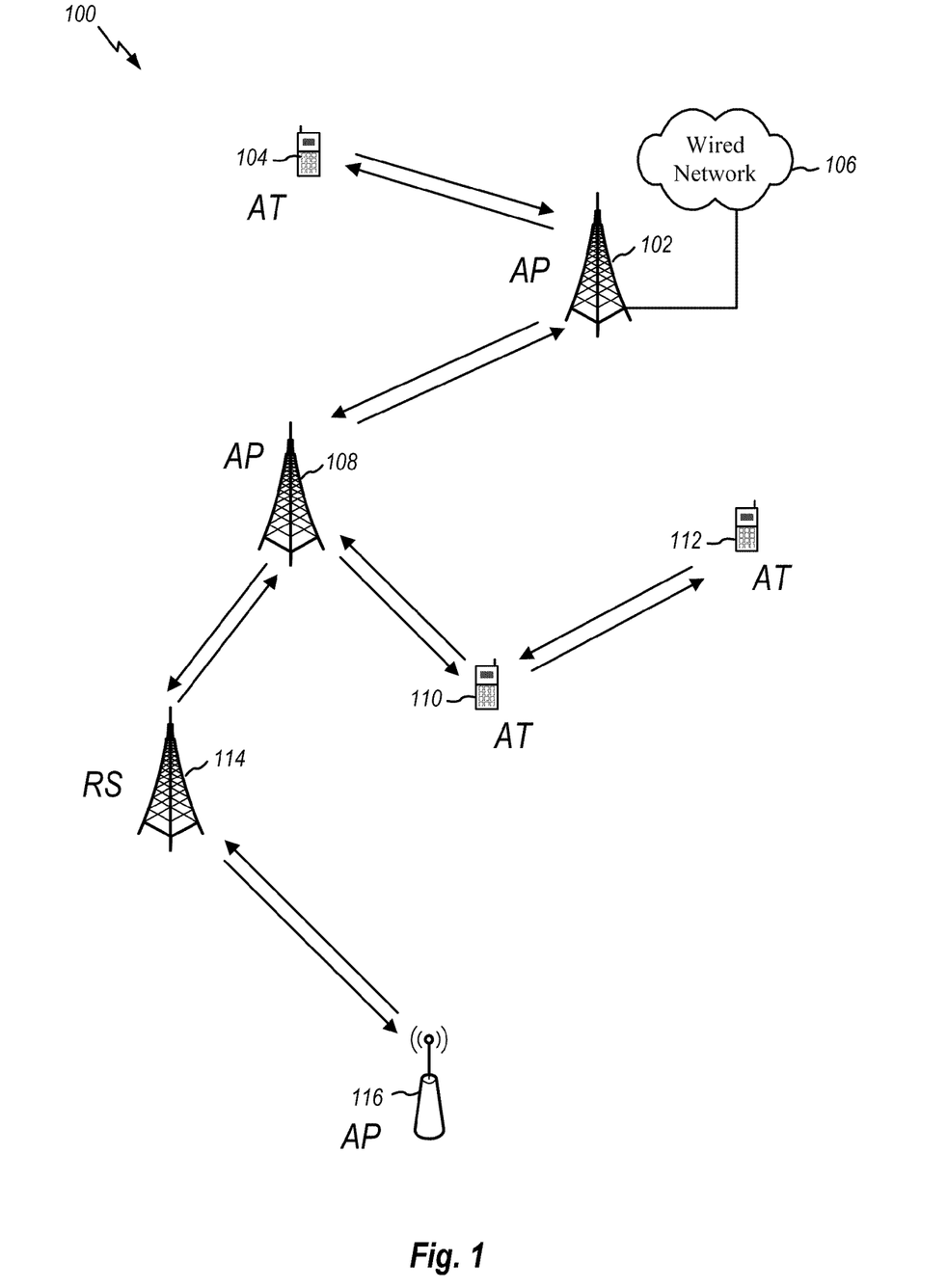
FIG. 1 is an example of a network architecture in which the present apparatus and methods may be utilized

FIG. 1 illustrates one example of a network architecture in which the present apparatus and methods may be utilized. The network 100 may be a mesh type network, microcell or micro network, femtocell network, picocell network, Wi-Fi, or a heterogeneous network of a combination of different types of nodes or APs, cellular or otherwise. Network 100 may include an AP 102 that provides network service for ATs, such as AT 104. Additionally, AP 102 is shown connected to a wired network 106 (and may also be wired to a normal source of power).

AP 102 is further illustrated wirelessly networked with another AP 108, which may be not wired to a normal source of power. AP 108 provides network service to an AT 110. As an example of peer-to-peer communication, AT 110 is shown in communication with another AT 112. In an aspect, the presently disclosed apparatus and methods could be implemented in an AT, such as AT 110, in detecting a beacon from another AT, such as AT 112. FIG. 1 also illustrates a relay station RS 114, which is in communication with AP 108. RS 114 may effect relaying or repeating of wireless communications from one AP (e.g., AP 108) to one or more other APs, such as AP 116.

It is noted that the APs illustrated in FIG. 1 may be configured to broadcast a preamble or other similar identifying signals that enable discovery by both active and idle ATs as well as by neighboring APs. Furthermore, one or more the APs feature an idle mode, which enables portions of the APs to shut down or operate at reduced power for power savings. The APs will accordingly utilize a duty cycle of toggling between the power saving idle mode and waking up for preamble transmission. Accordingly, the presently disclosed apparatus and methods include implementation of AP idle mode with adaptive setting or variation of the duty cycle that is responsive to at least one of two conditions: the presence of neighboring device (e.g., the presence of ATs or other APs), and the state of the neighboring devices (e.g., idle or active). For purposes of this application, these at least two conditions may be collectively referred to by the term "neighborhood conditions" that connotes at least one of the presence (or lack thereof) of other devices (e.g., APs, RSs, or ATs) in the neighborhood or range of the AP and the states or requests of these other devices.

It is noted that when considering implementing an idle mode in an AP, a number of considerations should be taken into account. A first consideration is latency in the AP. Overall delay up to a few seconds between an initial AP power-up and transition to the connected state may be tolerable. In an aspect, idle APs should be able to transition to the connected state within approximately 200 ms from a successful page reception in order to enable applications that may require fast call setup, such as Push to Talk (PTT) applications. For the connected ATs, switching (handoff) latency should be on the order of 50 ms or such.

Another consideration is mobility of devices in the network. In one aspect high mobility should be supported by an AP for relatively high speeds (e.g., speeds reaching up to 350 km/h) in order to be consistent with wireless standards requirements, such as International Mobile Telecommunications Advanced (IMT-A). However supporting such high mobility can be difficult especially in the context of low-cost low-power APs or RSs that are also characterized by a small cell coverage area. Higher speed mobility can be handled by a low-density overlay macro-cellular deployment that would be present to ensure ubiquitous coverage, and therefore characterized by high transmit power with a steady power source. However, power save operation is particularly beneficial for low-cost underlay micro-cellular deployments which target high capacity in densely populated areas. Thus assuming mobility speed in a densely populated area would, on average, be somewhat less, in an aspect mobility of up to approximately 60 km/h within such micro-cellular networks could be supported and still provide continuous broadband experience, as well as minimization of needed switching between micro-cellular and macro-cellular overlay for users. For connected ATs, handoff delay on the order of 30-50 ms would be acceptable.

Yet another consideration is the value of an AT wake-up duty cycle. In an aspect, it would be beneficial if the typical average value for the AT wake-up cycle in idle mode does not noticeably exceed the AT idle mode duty cycle for existing cellular systems, which in known systems would be few tens of a percent to a percent depending on AT mobility and the presence of tight synchronization between APs as a couple of examples. It is therefore desirable to have a duty cycle for AP idle operation that yields no or minimum increase in AT wake-up cycle under the same conditions.

A final consideration is the value of the AP wake-up duty cycle. A wake-up duty cycle on the order of a few percent would yield a substantial AP battery saving compared to the active or active hold mode where a typical AP duty cycle would be larger than 10%.

In general, the present apparatus and methods afford an adaptively variable duty cycle for idle mode, rather than a fixed duty cycle as known in AT idle modes in order to maximize efficiency of AP idle modes. Furthermore, in light of the above discussed considerations, design of ATs or RSs having an idle mode may be configured to operate in one or more various ways. Similar to AT idle modes, idle APs should operate with a low duty cycle during which they perform a number of functions.

One function that APs should carry out during idle mode is a periodic preamble transmission, which is configured to be variable based on area conditions will be discussed in further detail below. The preamble, among other things, enables the APs to be discovered by active and idle ATs as well as neighboring APs. Similarly, APs need to discover their neighbor APs that may also be in idle mode. Neighbor discovery is desirable to enable mobility support as will also be discussed further below.

In order to minimize their own wake-up cycle as well as wake-up cycle of their neighbors and idle ATs in the area, it is may be further desirable that idle APs achieve the best local synchronization possible. Furthermore, APs may be configured to indicate the presence of AT mobility to their neighbors so that an idle AP could wake up ahead of time anticipating a mobile AT that could move into its coverage area so that hand-in latency can be minimized Finally, idle APs may need to carry out paging of idle ATs. For the sake of brevity, it is noted that an AP or an RS (or an AT that serves in a peer-to-peer connection) will collectively be referred to simply as an AP in the remainder of this application.

Figure 2:
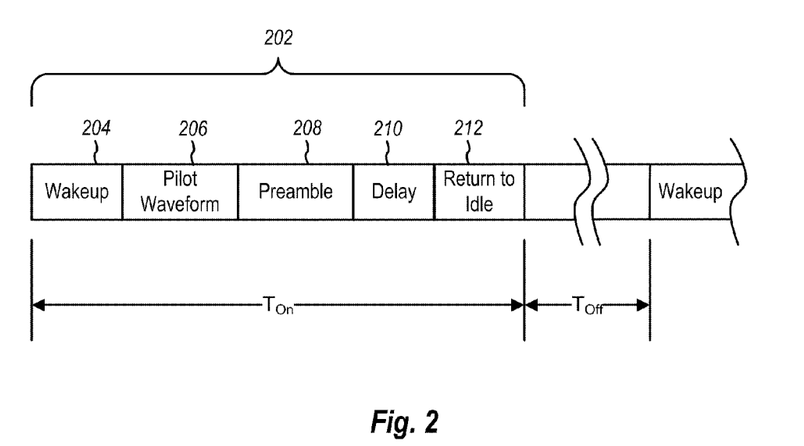
FIG. 2 is a timeline illustrating an idle mode duty cycle of a wireless device and the functions occurring during the duty cycle.

FIG. 2 illustrates a representative timeline for an AP duty cycle, where the AP is cycling in and out of an idle mode. It is noted that the timeline is simplified for the sake of clarity, and that various other operations, and gradations of time may occur in addition to those illustrated. As may be seen, when an AP is woken up from an idle mode, the main components of an AP wake-up cycle or period 202 consist of an initial wakeup operation 204, generation and transmission of a pilot waveform 206, generation and transmission of a preamble 208, a certain time period elapse 210 to enable AT access or hand-in, and turn off 212. The pilot waveform 206 is primarily used for time/frequency tracking of the AP by an AT or other AP, hence it needs to carry at least a portion the AP identifier (e.g., cellID). The preamble payload 208 of an AP may include, among other items, the full cellID needed for unambiguous AP identification in a possibly dense unplanned network, system time, potential information about AP configuration (e.g., L1/L2 dual-band global positioning), as well as AP idle mode configuration such as the preamble periodicity, for example. Additionally, AP preamble should indicate the presence of active or idle ATs in the vicinity which information can be used by neighbor APs for idle/active state transition.

The wake up period or time in which the AP is turned on for pilot and preamble transmission is indicated by Ton and the turned off time by Toff. According to the presently disclosed methods and apparatus, ratio of the Ton to the total cycle time (Ton+Toff); i.e., the idle mode duty cycle; may be adaptively varied based on neighborhood conditions, which includes both presence and state of other neighboring wireless devices. It is noted here that detection of these conditions may be effected by a receive chain in the AP to detect the presence of signals (e.g., a beacon) from the other devices, and may be performed with low power idle mode circuitry or normal power circuitry in the AP. The variation may be a variation of the $T_{off}$ period to increase this period, a reduction in the $T_{on}$ period, or variation of both periods that results in an overall reduction in the $T_{on}$ period in relation to the $T_{off}$ period. The following discussion provides a number of different neighborhood condition scenarios and examples of methodologies for adaptively setting or varying the idle mode duty cycle to maximize power reduction in each scenario.

In a first scenario, the neighboring area of an AP lacks the presence of ATs (or other APs). In such case, the maximum periodicity between AP pilot transmissions in the idle mode is limited by the overall delay of transitioning to the connected state for ATs at initial power up. In order to meet the above requirements, the overall preamble duration including pilot waveform, payload and access slots can be reduced to a minimal value needed to still transmit a preamble. In an example, this minimal value may be approximately 1-2 ms thereby affording an idle mode duty cycle within tenths of percent of a normal or normative duty cycle. For purposes of the present discussion, a normative duty cycle is that which is needed to serve active APs or ATs in the vicinity of the serving AP transmitting a preamble in order to meet the aforementioned conditions. In an example, this time period would be approximately in the range of 1-2 seconds. The normative duty cycle could also be expressed as the minimum periodicity for preamble transmission, where the period or time between preamble transmissions (e.g., Toff) is at a minimum value necessary for serving an active wireless device, such as an active AT.

Figure 3:
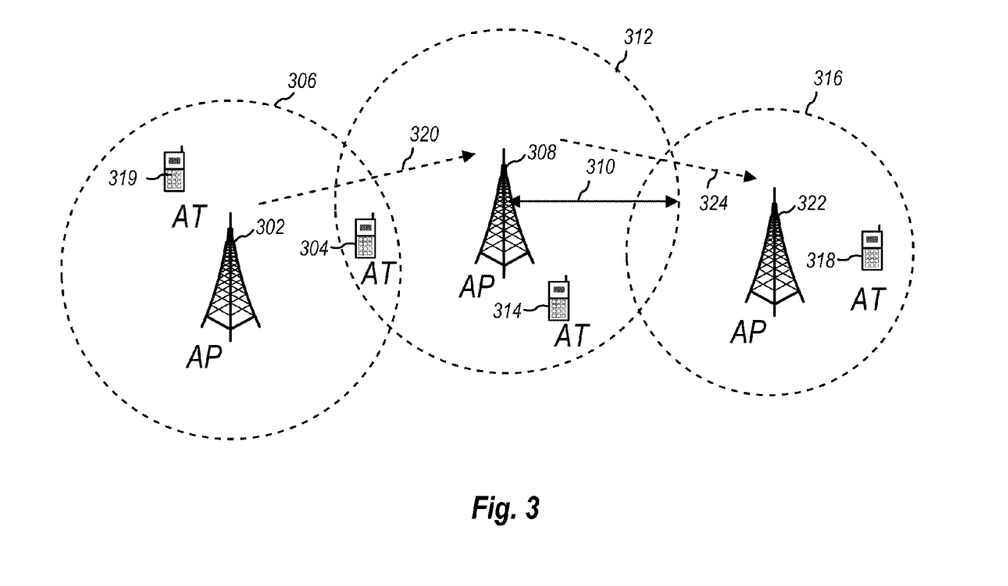
FIG. 3 illustrates a portion of network in which adaptive setting of an idle mode duty cycle is effected according to various disclosed methodologies.

FIG. 3 illustrates another scenario where an AP 302 includes at least one idle AT 304 located in a neighborhood or coverage area 306 of the AP 302 in a wireless network, such as the network in FIG. 1. AP 302 may determine during a wakeup period whether the neighborhood conditions of neighborhood 300 yield detection of a neighboring wireless device, such as an AT. In the presence of an idle AT 304 within the vicinity of AP 302, the idle mode duty cycle of AP 302 is increased to a value greater than the minimal duty cycle value discussed above, but less than a normative value. Stated another way, the duty cycle may be increased to a fraction of the normative duty cycle over the above scenario where no active or idle mode ATs are in the neighborhood of the AP 302. In particular, the AP may determine or vary the duty cycle to reduce the wake-up period to approximately around 200 ms. Given the previous scenario above with no ATs or other device present, this would represent an increase of the duty cycle by tenths to units of a percent in that example. Assuming another scenario where the AT 304 in FIG. 3 is active, the duty cycle of AP 302 can be adaptively varied to accommodate this situation. In one aspect, the idle mode duty cycle may be set to an active idle mode duty cycle when the AT 304 is active. In one example, the term "active idle mode duty cycle" may be simply a full or maximum duty cycle predetermined for accommodating active ATs that are connected to the AP. Thus, the AP must have a sufficient duty cycle length to ensure the AP wakes up often enough to handle power up or sleep-to-active mode delays and still receive and process transmissions from the connected, active AT. In another aspect, an AP (e.g., 302) may sense an active AT in its vicinity, but the AT may not be currently communicating with the AP. In this case, the "active idle mode duty cycle" could be somewhat less than a full active duty cycle such as in the case of an active, connected AT, yet greater than the other scenarios above where ATs in the vicinity are idle or not present. Thus, the value of the "active idle mode duty cycle" may be varied or determined in the AP based on whether or not the AT operating in an active mode is currently communicating with the wireless device.

It is noted here that one of the major challenges with implementing an idle AP mode is ensuring a fast hand-in of active mobile ATs connected to neighboring APs, such as an AP 308. In micro-cellular deployments, as one example, coverage radius (e.g., 310) of an AP cell 312 could be as small as 20-30 m depending on the transmit power limitation, frequency band and propagation conditions. In such cells, a mobile AT moving at 60 km/h would be able to cover one cell radius 310 in about 1-2 seconds, which happens to be the desired or normative wake-up period of idle APs as mentioned above. As a solution, an AP (e.g., 302) can be configured to wake up whenever there is an active AT (e.g., 314) in a neighboring cell. Furthermore, an AP that is two cells apart (e.g., cell 302 being two cells apart from cell 316) from an active mobile AT (e.g., AT 318) may need to wake-up or at least reduce its wake-up period to ensure robust hand-in. However waking up multiple tiers of APs in the vicinity of an active AT reduces AP power efficiency substantially. A general solution to this problem could be a gradual (tiered) reduction of AP wake-up period depending on the distance from an active AT, where "distance" may be defined to mean the number of APs or cells (i.e., hops) in the signal routing between two network devices.

In particular, any AP having an active AT within its coverage can be configured to stay awake and therefore transmit a preamble with the minimum periodicity (e.g., that is the duty cycle of time on to time off is increased).

Furthermore, such APs with active ATs may be further configured to broadcast a minimum distance value (e.g., a value "0") from an active AT as part of preamble payload. Any AP that does not have active AT within its coverage broadcasts the distance value set to the minimum distance advertized by its neighbors incremented by a value of one (1). For example, if AP 302 has an active AT (e.g., 319) in its coverage area 306, AP 302 would transmit a minimum distance value of "0" in its preamble payload (e.g., 208) that is received by neighboring AP 308, as indicated by arrow 320. Assuming AP 308 has no active ATs in its coverage area 312, AP 308 would increment the minimum distance value "0" of AP 302 and transmit a value "1" as the distance value in its preamble to its neighbors, such as AP 322 and indicated by signal arrow 324. Although not shown, if AP 322 had no active ATs in its coverage area 316, AP 322 could increment the distance value "1" received from AP 308 and broadcast a distance value of "2" in its preamble, and so forth.

In the above definition, a neighbor AP can be defined in terms of the measured received signal strength as long as (approximate) transmit power of that neighbor is advertized (e.g., as part of preamble). Finally, every AP adaptively varies its respective duty cycle or wake-up period (e.g., 202), or eventually may decide to stay active based on its distance value. Accordingly each AP may adaptively vary its idle mode duty cycle to maximize power savings dependent on the neighborhood conditions.

In an aspect, the above-described methodology of providing a distance metric for active devices may be applied to idle devices as well. For example, an AP could transmit the shared minimum distance value (i.e., the same distance value) concerning both active and idle devices. In still another variation, separate or different metrics could be applied for active and idle devices, where minimum distance values are differently configured for respective active and idle devices.

The above-described approach of tiered wake-up cycles or variations thereof enables a tradeoff between AP power efficiency on the one hand and AT switching delay and reliability on the other hand. In an aspect, it is noted that a similar tiered strategy could be applied to AP idle mode configuration depending on the distance with respect to an idle AT.

In light of the above discussion, it is evident that an AP in idle mode needs to not only transmit a preamble periodically, but also may need to search for preambles from neighboring APs. At the same time, it may be desirable to align or synchronize wake-up instances of neighboring APs as much as possible in order to reduce wake-up duty cycle of idle APs. Accordingly, in one or more aspects discussed below, various methods may be utilized with synchronized neighboring APs with an eye toward maximizing power savings and keeping the wakeup time of the APs at a minimum.

In one aspect, preamble transmission and reception by idle APs may be alternated. That is, once preamble periods of different idle APs are approximately aligned in time, any particular AP may be configured to define a subset of wake-up instances when it searches preambles of its neighbors rather than transmits its own preamble. Thus, in a simplified time flow example illustrated in FIG. 4, an AP 402 would transmit a preamble at instance or time A, which is received by other APs set for reception at that time instance such as AP 404. At a next time B after time A, AP 404 is configured to transmit its preamble, while other APs are configured to receive at that time, such as AP 402. Thus, each AP may be configured to alternate between transmission and reception of preamble transmission during respective time periods (e.g., idle mode cycles, where one cycle is Ton+Toff as illustrated in FIG. 2). It is noted that alternating transmission and reception could be in consecutive cycles, or in other arrangements such as two consecutive preamble transmissions followed by a preamble reception, and so forth. Additionally, the transmit and receive of preamble transmissions among nodes (APs or ATs) may be staggered or randomized.

Figure 4:
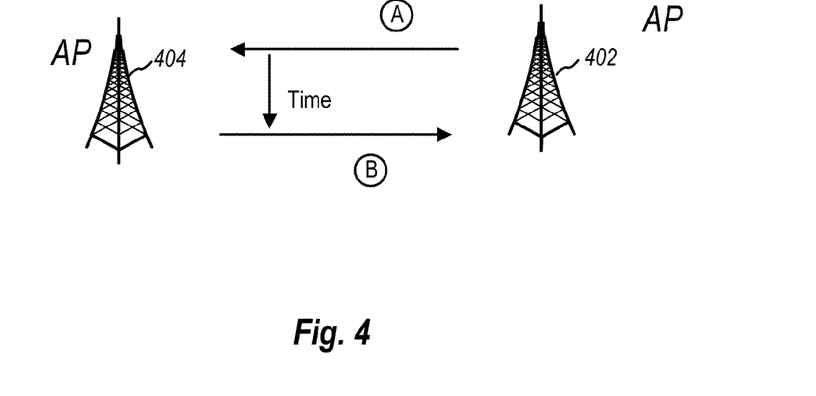
FIG. 4 illustrates a portion of network in which adaptive setting of an idle mode duty cycle is effected according to the alternating transmission and reception of preambles.

To further facilitate this operation and prevent instances when an AP wakes up to search for its neighbor that happens to perform a neighbor search at the same time, in an aspect the subset of search instances or slot selection of every AP may be defined as a regular or pseudo random function of its cellID and system time. Note that the procedure of alternating or staggering transmission and reception cycles is most cost effective in an AP employing Time Division Duplex (TDD) operation since no additional RF receive or transmit chains are required by the AP.

Another method includes providing a preamble channelization scheme dependent on the total system bandwidth available as well as the anticipated interference conditions seen within the coverage region of idle APs. Broadly speaking, a distinction may be made between cases where a preamble is spread over an entire available bandwidth (e.g., full reuse) or frequency or time reuse. Frequency and time reuse designs most naturally apply to scenarios where most of the interference is coming from collisions of preambles generated by different APs, while full reuse more naturally applies when other sources of interference are present and are possibly dominant. Additionally, a time reuse design may allow an AP to transmit its preamble in some time slots of a transmission signal frame and listen to neighbors' preambles in other time slots of the frame. It is noted that traffic interference would be very uncommon within the coverage region of an idle AP (except for possibly external interference when operating in an unlicensed band) while performance loss due to a somewhat higher level of traffic interference in the active state will be compensated by a relatively high duty cycle of the preamble.

In yet another aspect, methods for synchronization may include methods to effect Inter-AP synchronization. Such synchronization is beneficial for reducing the wake-up duty cycle of idle APs and, significantly idle ATs as well. Note that global and accurate (GPS like) synchronization may not be practical in micro-cellular deployments where many APs may not have access to GPS signal. Furthermore a low wake-up duty cycle prevents idle APs from keeping accurate timing across multiple wake-up cycles. Hence idle APs can be configured to refine their timing periodically in order to achieve local synchronization. This can be achieved based on the aforementioned process of alternating transmission and reception by idle APs. Furthermore, the problem of timing resolution can be defined in order to handle scenarios where different network clusters with different time references meet each other. Such a situation arises when a new AP becomes visible by two other APs that otherwise cannot see each other, as an example (e.g., if AP 308 became visible to both APs 302 and 322 in FIG. 3, which cannot see each other due to lack of range).

A common timing reference can be achieved based on the earliest timing seen locally in a neighborhood, as one example. In other words, an AP that can see preambles from other APs with different timing will slave or match its timing to the earliest system time seen. If the earliest system time seen, however, is from an AP having only idle mode ATs in its vicinity, it may be undesirable to slave timing this time. Thus, in an aspect the earliest system time may be determined based on predetermined criteria, such that priority is given to the earliest time reference received from an AP having active devices over an earliest timing from an AP with idle devices. It is also noted that priority of slaving may also be more generally based on traffic load of an active AT.

It is further noted that the problem of timing adjustment needs to be solved for active APs as well and can be managed similarly by alternating preamble transmission and reception cycles as discussed above in the example of FIG. 4. The key differences between idle and active AP timing adjustment are that active APs need to maintain a high duty cycle of preamble transmission versus preamble reception, and that idle APs can adjust by slamming their timing while active APs may instead have to slew their timing. Finally, the hidden receiver problem should be noted where an AT can see two APs that cannot see each other's preambles. Given the fundamental nature of this problem, an AT would need to be configured with logic to detect asynchronous preambles of idle APs. To minimize the impact of this problem on AT performance, AP preamble and, in particular, pilot transmission design should shoot for the maximum penetration.

It is also noted that priority classes of messages, such as paging, presents a particularly challenging problem for APs without wired connectivity. Taking the example of paging as merely one example of priority messages, the total perceived paging delay includes time needed to deliver a page from the closest (serving) AP to the AT as well as time needed to deliver this page to the serving AP. In a mesh network with multiple wireless hops to the target AP, such as was illustrated in FIG. 1, the time delivery of the page to the serving AP may be quite substantial. It is noted that this problem is somewhat similar to the problem of ensuring fast hand-in of active ATs in a neighborhood and hence a similar tiered solution can be applied.

In particular, the wake-up duty cycle of an idle AP may then be configured to depend on the distance from a registered idle AT and its priority class (e.g. defined by call setup latency requirements). The high-level approach to distance calculation is similar to the one described before in connection with FIG. 3; namely, an idle AP computes distance per priority class by incrementing the minimum distance per class seen from its neighbors. The minimum (starting) value is set by the AP where an AT has last registered. After computing distance values corresponding to different priority classes, an AP can be configured to map these values to wake-up period values. The actual wake-up period is defined as the minimum across values corresponding to different priority classes. The value of an increment as well as the exact relationship between wake-up period, priority class, and distance may be different dependent on a particular network topology.

Additionally, an AP may need to carry paging information in its preamble payload (208). For example, paging notification designated to other unwired APs in the area so that an idle AP can be notified of a page intended for an idle AT in the neighborhood. Detailed page information can be transmitted by an AP as part of extended preamble or a dedicated channel at a predefined time relative to the paging notification so that another AP can receive detailed page information upon wake-up after it has received page notification. It is noted that paging notification can be limited to as little as a single bit carried in the preamble. It is also noted that paging on the overlay macro network could remain the default paging mechanism for applications that require fast call setup such as Voice over IP (VoIP), Push to talk (PTT), etc.

Figure 5:
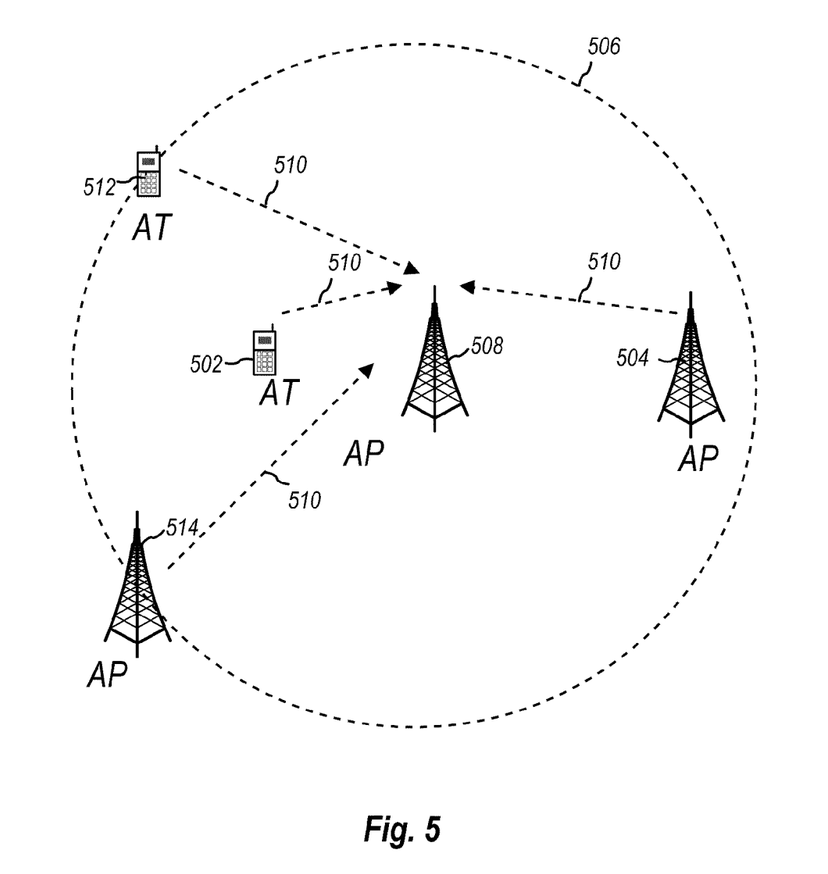
FIG. 5 illustrates a portion of network in which adaptive setting of an idle mode duty cycle is effected via demanded preamble transmissions

In a further scenario, adaptive variation or setting of the idle mode duty cycle may also be based on or responsive to a demand or request for preamble transmission received from another wireless device. As illustrated in FIG. 5, an AT 502 or AP 504 is located within the coverage area 506 of an AP 508. Periodically the AT 502 or AP 504 transmits a signal or beacon 510, which is termed herein as a "send preamble" message. In an aspect, AP 508 may be configured to view the send preamble message(s) 510 as a request for a transmitting a preamble only when requested by a neighboring AT or AP (502, 504). APs thus may be configured to wake up in a certain slot (i.e., time period) or slots and monitor transmissions, including the send preamble message. A disparate or less proximate AT or AP (shown with examples AT 512 and AP 514) may also broadcast a "send preamble" messages 510 during the slot(s). Accordingly, in another aspect the APs may be configured to determine whether a sensed "send preamble" message is of sufficient power or energy as compared to a threshold, for example, thereby determining proximity. Only those messages above the threshold will cause the sensing AP to start transmitting its preamble. Such an on-demand preamble would help cut down on power consumption as reception of data typically requires less power than transmission. Also, the wake up time can be decreased (i.e., variation of idle mode duty cycle) since the AP can more quickly turn off if either no send preamble message is sensed or none of the sensed messages exceeds the threshold requiring preamble transmission.

In an alternate aspect of the above scenario, a partial "on-demand preamble" may be used. In this example, the AP 508 may be configured to send out some signals (not illustrated in FIG. 5), such as acquisition pilots, and not other signals, such as the cell ID. An AT (e.g., 502) or AP (e.g., 504) can acquire the pilots, determine the timing of that AP (e.g., 508) and transmit a "send preamble" message 510 in that slot. The AP 508 can then transmit the additional signals needed for the AT (or AP) to access. A full on-demand preamble may be useful in the case when all APs and ATs have a common time reference (such as GPS) while a partial on-demand preamble would be useful when the AT needs to first derive a time reference from the AP. It is noted that a received preamble or portion thereof, such as the pilots, may be interpreted as preamble request or demand signal.

In still another aspect, it noted that a wireless AP may be configured to adaptively reduce its power or duty cycle by determining a neighborhood condition where the AP in configured to sense that an AT it wants to serve is not in close proximity or is connected to another serving network. As an example of this aspect, a home WiFi router (i.e., the wireless AP) may reduce its power or duty cycle if it determines or knows that an AT device is connected to an office network, for example.

Figure 6:
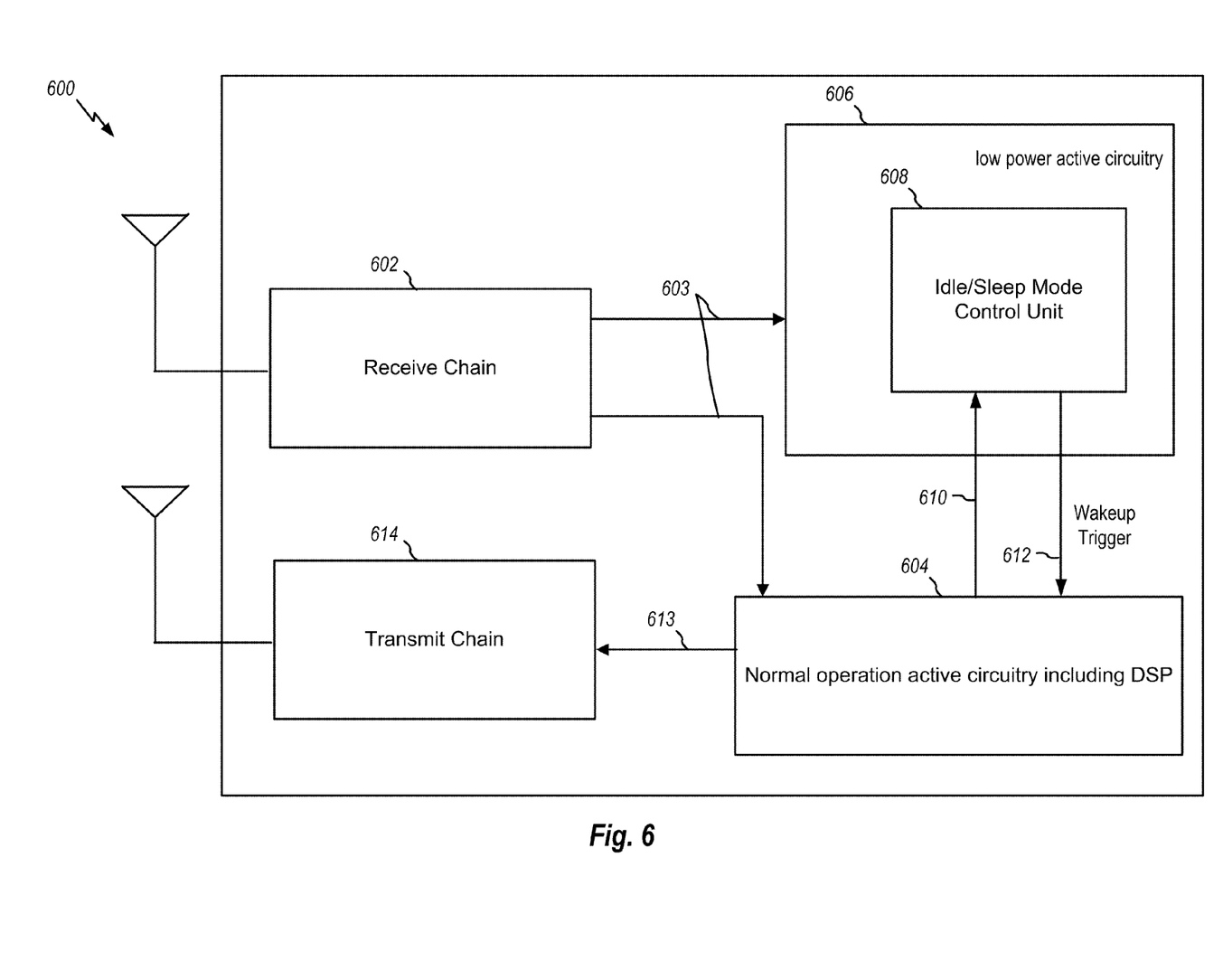
FIG. 6 illustrates a wireless device that includes adaptive setting of an idle mode duty cycle according to the present disclosure.

FIG. 6 illustrates an exemplary wireless device 600, such as an AP or AT in peer-to-peer mode, that is configured to adaptively set an idle mode duty cycle based on neighborhood conditions. As illustrated, the device 600 includes a receive chain 602 that is configured to receive RF signals from other wireless devices. The receive chain 602 may be configured according to any number of RF receiver designs known in the art. The received signals 603 from RF chain 602 may be delivered to active circuitry or normal power circuitry including a DSP 604 for processing. In an example, circuitry 604 may process received preamble transmissions from other devices, such as APs or communication signals from ATs or APs. Additionally, the RF chain 602 may output signals to a low power or idle mode circuitry 606 used for essential functions such as system timing and sensing circuitry operable during idle or sleep periods to save power consumption by the active circuitry 604, as well as signal wakeup of circuitry 604.

The idle mode circuitry 606 includes an Idle/Sleep Mode Control Unit 608 that is used to execute the idle mode duty cycle that is variably set by active circuitry 604 and communicated via coupling 610. In an alternative, the controller 608 may determine the idle mode duty cycle based input information via coupling 610, and including neighbor condition information such as received and decoded preamble information (enumerated before), distance values, priority values, alternating preamble settings, as a few example. Additionally, it is contemplated that at least a portion of information from RF chain 602 could be processed by the low power circuitry 606 to offload some processing from active circuitry 604. Without repeating the methods, processes, and techniques discussed before, it will be appreciated by those skilled in the art that either circuitry 604, 606, or any combination thereof may effect these various methods, processes, and techniques used for setting the idle mode duty cycle as well as determination and communication of distance values, effecting alternating preamble transmission, performing preamble channelization, and effecting inter AP synchronization. It is noted that circuitry 606 and control unit 608 may consist of hardware, firmware, software, or any combination thereof.

The idle mode control unit 608 may also be configured to issue a wakeup trigger 612 to active circuitry 604 at the beginning of the wakeup period. Active circuitry 604, in an example, generates the preamble transmission and other information such as distance values (or the incrementing thereof), and additional channels such as for paging notification. Circuitry 604 may encode the information to be transmitted and outputs the preamble transmission (as well as other channels and communication signaling) 613 to transmit chain 614 for transmission to the other APs or ATs.

Figure 7:
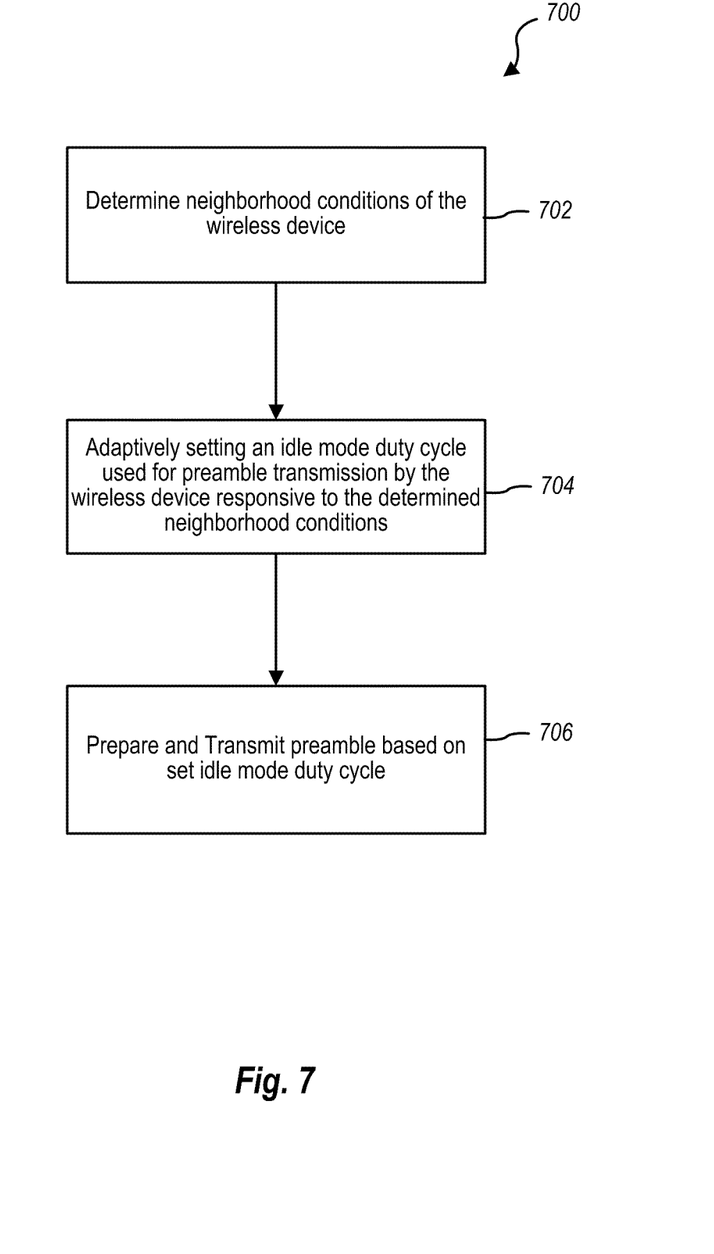
FIG. 7 illustrates an exemplary method for adaptive setting of an idle mode duty cycle.

FIG. 7 illustrates a method 700 that may be used to control an idle mode in a wireless device such as an AP or AT. As illustrated in block 702, method 700 includes first determining neighborhood conditions of the wireless device. As discussed previously, determination of neighborhood conditions may involve reception of preambles from other devices such as an AP, or signals from ATs in the coverage of the wireless device to determine the presence or state of such devices. This may also involve reception of distance values within preambles from other APs or ATs (in peer-to-peer mode) and determining distances to active wireless devices from the distance values as discussed above, or receiving paging notifications in preambles or via dedicated channels.

After determination of the neighborhood conditions in block 702, flow proceeds to block 704 where the process of adaptively setting an idle mode duty cycle used for preamble transmission by the wireless device responsive to the determined neighborhood conditions is performed. As discussed at length previously, the adaptive setting of the duty cycle includes increasing or decreasing the duty cycle, as well as setting the duty cycle in conjunction with alternating transmission and reception of preambles, setting the duty cycle based on distance values, preamble channelization, or inter-AP synchronization as a few examples.

After adaptively setting the idle mode duty cycle, method 700 may also include preparing and transmitting the preamble according to the set duty cycle as indicated in block 706. In an alternative, block 706 may encompass the processes of transmission of the preamble that alternates with reception of preambles from other devices. Additionally, preparing the preamble may be configured to include distance values (including incrementing such values prior to transmission), and similarly priority and distance information for situations such as paging.

It will also be appreciated by those skilled in the art that method 700, or various portions thereof, will be continuously repeated at a suitable periodicity in order to respond to changing neighborhood conditions. Also, the flow diagram of FIG. 7 has omitted, for sake of simplicity, various conditions, comparisons, and loops that may occurs to implement the various processes, but which would be known to those skilled in the art.

Figure 8:
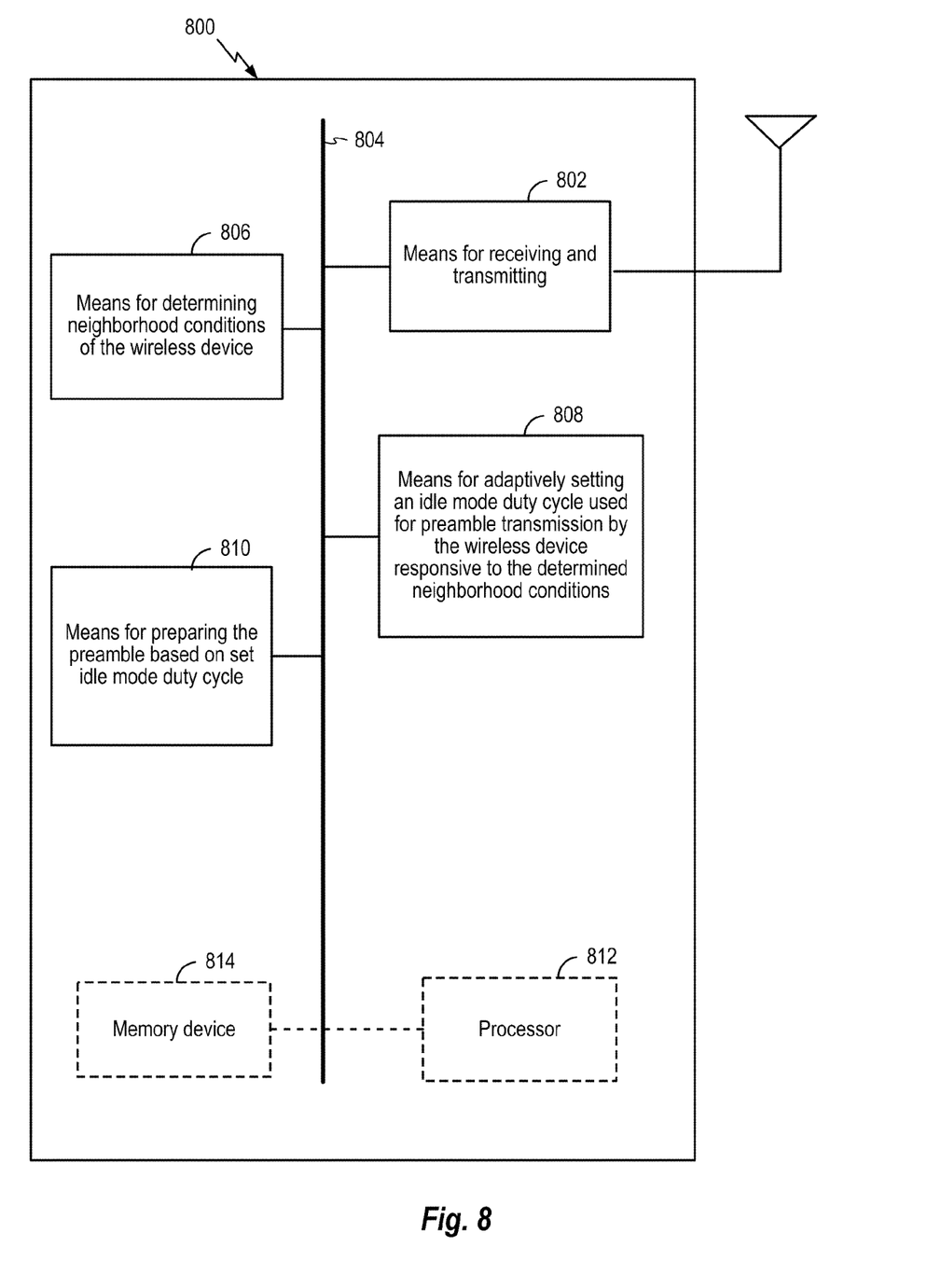
FIG. 8 illustrates another apparatus for use in wireless device for effecting adaptive setting of an idle mode duty cycle.

FIG. 8 illustrates another apparatus 800 for use in wireless device for effecting adaptive setting of an idle mode duty cycle. It is noted that apparatus 800 may be considered to be either the entire wireless device (e.g., an AP, RS, or AT), or a portion of a wireless device that effects the disclosed adaptive setting of an idle mode duty cycle. Apparatus 800 includes a receiver/transmitter module or means 802 for receiving and transmitting signals including preambles and beacons from and to other wireless devices in the coverage area. Means 802 may be implemented by receive chain 602 and transmit chain 614 as one example.

The signals from and to means 802 may be communicated by a communication coupling 804, such as a bus or similarly suitable alternative. Signals received may be communicated to means for determining neighborhood conditions of the wireless device 806. Means 806 may be configured to effect any of the various determinations of neighborhood conditions disclosed herein, and may be implemented by normal power circuitry 604, low power circuitry 606 (e.g., control unit 608), a combination thereof, or any other suitable equivalents. As discussed previously, determination of neighborhood conditions may involve reception of preambles from other devices such as an AP, or signals from ATs in the coverage are of the wireless device to determine the presence or state of such devices. This may also involve reception of distance values within preambles from other APs or ATs (in peer-to-peer mode) and determining distances to active wireless devices from the distance values as discussed above, or receiving paging notifications in preambles or via dedicated channels.

The neighborhood condition determined by means 806 may then be communicated via coupling 804 to Means for adaptively setting an idle mode duty cycle used for preamble transmission by the wireless device responsive to the determined neighborhood conditions 808. Means 808 may be implemented by normal power circuitry 604, low power circuitry 606 (e.g., control unit 608), a combination thereof, or any other suitable equivalents. Furthermore means 808 may be configured to effect any of the various ways of adaptively setting the duty cycle such as increasing or decreasing the duty cycle, as well as setting the duty cycle in conjunction with alternating transmission and reception of preambles, setting the duty cycle based on distance values, preamble channelization, or inter-AP synchronization, as a few examples.

Additionally, apparatus 800 may include a means for preparing the preamble transmission according to the set duty cycle 810 for transmission by means 802. In addition to preparing a pilot waveform and preamble payload, means 810 may be configured to preparing the preamble payload to include distance values (including incrementing such values prior to transmission), and similarly prepare priority and distance information for situations such as paging. Means 802 may be implemented by active circuitry 602, according to one example.

As an alternative, apparatus 800 also illustrates that a processor 812 and accompanying memory 814 to store processor instructions therein may be included for implementation of various processing needed by the various modules in apparatus 800. Also, in an alternative, each of the modules 804, 806, and 808 could be implemented by a single processor, such as a DSP, or a low power processor.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In alternatives, the storage medium may be integral to a processor. Also, the processor and the storage medium may reside in an ASIC and the ASIC may reside in a wireless device. In another alternative, the processor and the storage medium may reside as discrete components in a device.

The word "exemplary" is used herein to mean "serving as an example, instance, or illustration." Any example described herein as "exemplary" is not necessarily to be construed as preferred or advantageous over other examples.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for controlling an idle mode in a wireless device, the method comprising:
    determining neighborhood conditions of the wireless device, which includes determining presence and states of other wireless devices in the neighborhood of the wireless device, wherein determining neighborhood conditions of the wireless device includes determining at least another wireless device operating in an active mode or an idle mode in a vicinity of the wireless device;
    adaptively setting an idle mode duty cycle used for at least preamble transmission by the wireless device responsive to the determined neighborhood conditions; and
    transmitting the preamble transmission including a minimum distance value configured to communicate to at least one neighboring serving wireless device the presence of the at least another wireless device operating in the active mode or the idle mode in the vicinity of the wireless device.

2. The method as defined in claim 1, wherein the preamble transmission includes at least one of a pilot waveform and a preamble payload configured to at least allow discovery of the wireless device by at least one other wireless device.

3. The method as defined in claim 2, wherein the preamble payload includes at least one of an identifier particular to the wireless device, system time, a configuration of the wireless device, an idle mode configuration, and information concerning the presence and state of neighboring wireless devices.

4. The method as defined in claim 2, wherein the pilot waveform includes a portion of an identifier particular to the wireless device.

5. The method as defined in claim 1, further comprising:
    adaptively setting the idle mode duty cycle to a minimal duty cycle value still affording preamble transmission when no other wireless devices are determined to be in the vicinity of the wireless device.

6. The method as defined in claim 1, further comprising:
    adaptively setting the idle mode duty cycle to a value greater than a minimal duty cycle value and less than an active idle mode duty cycle value when the at least another wireless device operating in the idle mode is determined to be in the vicinity of the wireless device.

7. The method as defined in claim 1, further comprising:
    adaptively setting the idle mode duty cycle to an active idle mode duty cycle when the at least another wireless device operating in the active mode is determined to be in the vicinity of the wireless device.

8. The method as defined in claim 7, wherein the value of the active idle mode duty cycle is variably determined in the wireless device based on whether the at least another wireless device operating in the active mode is currently connected to the wireless device.

9. The method as defined in claim 1, the minimum distance value further comprising at least one of:
    a first minimum distance value configured for the at least another wireless device operating in an active mode; and
    a second minimum distance value configured for the at least another wireless device operating in an idle mode.

10. A method for controlling an idle mode in a wireless device, the method comprising:
    determining neighborhood conditions of the wireless device, which includes determining presence and states of other wireless devices in the neighborhood of the wireless device;
    adaptively setting an idle mode duty cycle used for at least preamble transmission by the wireless device responsive to the determined neighborhood conditions;
    receiving a preamble transmission from another neighboring wireless device that includes a distance value configured to communicate distance information to at least one neighboring serving wireless device having at least one of an active wireless device and an idle wireless device operating in a coverage area of the neighboring serving wireless device; and
    further adaptively setting the idle mode duty cycle based on the received distance value.

11. The method as defined in claim 10, further comprising:
    incrementing the received distance value by a predetermined amount when no active wireless device is present in a coverage area of the wireless device; and
    transmitting the incremented distance value to at least one further neighboring wireless device.

12. The method as defined in claim 1, further comprising:
    alternating transmitting the preamble transmission by the wireless device and receiving preamble transmissions in the wireless device from at least one neighboring wireless device during respective idle mode cycles.

13. The method as defined in claim 1, further comprising:
    transmitting the preamble transmission by spreading the transmission over at least a portion of frequencies in an available wireless bandwidth.

14. The method as defined in claim 1, further comprising:
    transmitting the preamble transmission by spreading the transmission over all frequencies in an available wireless bandwidth.

15. The method as defined in claim 1, further comprising:
    transmitting the preamble transmission in one or more particular time slots of a wireless transmission frame.

16. The method as defined in claim 15, wherein transmitting the preamble transmission in one or more particular time slots of a wireless transmission frame includes transmission of the preamble transmission staggered or randomized based on received preamble transmissions from at least one other wireless device.

17. The method as defined in claim 15, wherein transmitting the preamble transmission in one or more particular time slots of a wireless transmission frame includes selection of time slots based on a cellID of the wireless device.

18. A method for controlling an idle mode in a wireless device, the method comprising:
  determining neighborhood conditions of the wireless device, which includes determining presence and states of other wireless devices in the neighborhood of the wireless device;
  adaptively setting an idle mode duty cycle used for at least preamble transmission by the wireless device responsive to the determined neighborhood conditions;
  detecting timing information from at least one preamble transmission from at least one other wireless device;
  determining an earliest system time from the timing information and a system time of the wireless device based on predetermined criteria; and
  slaving the system time of the wireless device to the determined earliest system time.

19. The method as defined in claim 18, wherein the predetermined criteria includes giving priority to system times of another wireless device having active wireless devices in its vicinity over system times of another wireless device having idle wireless devices in its vicinity.

20. A method for controlling an idle mode in a wireless device, the method comprising:
  determining neighborhood conditions of the wireless device, which includes determining presence and states of other wireless devices in the neighborhood of the wireless device,
  wherein determining neighborhood conditions of the wireless device includes:
    determining a distance from the wireless device to an idle access terminal registered in a network based on at least one distance value received from at least one neighboring wireless device; and
    determining a priority class of the access terminal; and
  adaptively setting an idle mode duty cycle used for at least preamble transmission by the wireless device responsive to the determined neighborhood conditions and dependent on the determined distance and priority class.

21. The method as defined in claim 1, further comprising:
  transmitting paging information within one of the preamble and a dedicated paging channel to at least one neighboring unwired access point, wherein the paging information communicates paging information concerning at least one access terminal registered in a network.

22. The method as defined in claim 1, wherein determining neighborhood conditions includes determining a presence of at least one preamble demand signal from at least one neighboring wireless device,
  the method further comprising further adaptively setting the idle mode duty cycle based on the at least one preamble demand signal.

23. The method as defined in claim 22, further comprising: sending the preamble in response to the preamble demand signal.

24. The method as defined in claim 1, wherein the wireless device comprises one of an unwired access point (AP), an unwired relay station (RS), and an access terminal (AT).

25. An apparatus for controlling an idle mode in a wireless device, the apparatus comprising:
  means for determining neighborhood conditions of the wireless device, which includes determining presence and states of other wireless devices in the neighborhood of the wireless device, wherein the means for determining neighborhood conditions of the wireless device determines at least another wireless device operating in an active mode or an idle mode in a vicinity of the wireless device;
  means for adaptively setting an idle mode duty cycle used for at least preamble transmission by the wireless device responsive to the determined neighborhood conditions; and
  means for transmitting the preamble transmission including a minimum distance value configured to communicate to at least one neighboring serving wireless device the presence of the at least another wireless device operating in the active mode or the idle mode in the vicinity of the wireless device.

26. The apparatus as defined in claim 25, wherein the means for adaptively setting the idle mode duty cycle is configured to set the idle mode duty cycle to a minimal duty cycle value still affording preamble transmission when no other wireless devices are determined to be in the vicinity of the wireless device by the means for determining neighborhood conditions of the wireless device.

27. The apparatus as defined in claim 25, wherein the means for adaptively setting the idle mode duty cycle is configured to set the idle mode duty cycle to a value greater than a minimal duty cycle value and less than an active idle mode duty cycle value when the at least another wireless device operating in the idle mode is determined to be in the vicinity of the wireless device by the means for determining neighborhood conditions of the wireless device.

28. The apparatus as defined in claim 25, wherein the means for adaptively setting the idle mode duty cycle is configured to set the idle mode duty cycle to an active idle mode duty cycle when the at least another wireless device operating in the active mode is determined to be in the vicinity of the wireless device by the means for determining neighborhood conditions of the wireless device.

29. The apparatus as defined in claim 28, wherein the value of the active idle mode duty cycle is variably determined in the wireless device based on whether the at least another wireless device operating in the active mode is currently connected to the wireless device.

30. The apparatus as defined in claim 25, the minimum distance value further comprising at least one of:
  a first minimum distance value configured for the at least another wireless device operating in an active mode; and
  a second minimum distance value configured for the at least another wireless device operating in an idle mode.

31. An apparatus for controlling an idle mode in a wireless device, the apparatus comprising:
  means for determining neighborhood conditions of the wireless device, which includes determining presence and states of other wireless devices in the neighborhood of the wireless device;
  means for adaptively setting an idle mode duty cycle used for at least preamble transmission by the wireless device responsive to the determined neighborhood conditions; and
  means for receiving a preamble transmission from another neighboring wireless device that includes a distance value configured to communicate distance information to at least one neighboring serving wireless device having at least one of an active wireless device and an idle device operating in a coverage area of the neighboring serving wireless device,
wherein the means for adaptively setting the idle mode duty cycle sets the duty cycle based on the received distance value.

32. The apparatus as defined in claim 31, further comprising:
means for incrementing the received distance value by a predetermined amount when no active wireless device is present in a coverage area of the wireless device; and
means for transmitting the incremented distance value to at least one further neighboring wireless device.

33. The apparatus as defined in claim 25, further comprising:
means for transmitting the preamble transmission in one or more particular time slots of a wireless transmission frame.

34. The apparatus as defined in claim 33, wherein transmitting the preamble transmission in one or more particular time slots of a wireless transmission frame includes transmission of the preamble transmission staggered or randomized based on received preamble transmissions from at least one other wireless device.

35. The apparatus as defined in claim 34, wherein transmitting the preamble transmission in one or more particular time slots of a wireless transmission frame includes selection of time slots based on a cellID of the wireless device.

36. An apparatus for controlling an idle mode in a wireless device, the apparatus comprising:
means for determining neighborhood conditions of the wireless device, which includes determining presence and states of other wireless devices in the neighborhood of the wireless device;
means for adaptively setting an idle mode duty cycle used for at least preamble transmission by the wireless device responsive to the determined neighborhood conditions;
means for detecting timing information from at least one preamble transmission from at least one other wireless device;
means for determining an earliest system time from the timing information and a system time of the wireless device based on predetermined criteria; and
means for slaving the system time of the wireless device to the determined earliest system time.

37. An apparatus for controlling an idle mode in a wireless device, the apparatus comprising:
means for determining neighborhood conditions of the wireless device, which includes determining presence and states of other wireless devices in the neighborhood of the wireless device; and
means for adaptively setting an idle mode duty cycle used for at least preamble transmission by the wireless device responsive to the determined neighborhood conditions,
wherein the means for determining neighborhood conditions of the wireless device includes:
means for determining a distance from the wireless device to an idle access terminal registered in a network based on at least one distance value received from at least one neighboring wireless device; and
means for determining a priority class of the access terminal,
wherein the means for adaptively setting the idle mode duty cycle is configured to set the duty cycle dependent on the determined distance and priority class.

38. The apparatus as defined in claim 25, wherein:
the means for determining neighborhood conditions includes determining a presence of at least one preamble demand signal from at least one neighboring wireless device, and
the means for adaptively setting the idle mode duty cycle is configured to set the duty cycle based on the at least one preamble demand signal.

39. An apparatus for controlling an idle mode in a wireless device, the apparatus comprising:
at least one processor configured to:
determine neighborhood conditions of the wireless device, which includes determining presence and states of other wireless devices in the neighborhood of the wireless device;
adaptively set an idle mode duty cycle used for at least preamble transmission by the wireless device responsive to the determined neighborhood conditions; and
configure the preamble transmission including a minimum distance value configured to communicate to at least one neighboring serving wireless device the presence of at least another wireless device operating in an active mode or an idle mode in a vicinity of the wireless device when the at least one processor determines the at least another wireless device operating in the active mode or the idle mode in the vicinity of the wireless device; and
a memory configured to store instructions executable by the at least one processor.

40. The apparatus as defined in claim 39, wherein the preamble transmission includes at least one of a pilot waveform and a preamble payload configured to at least allow discovery of the wireless device by at least one other wireless device.

41. The apparatus as defined in claim 39, wherein the processor is configured to set the idle mode duty cycle to a minimal duty cycle value still affording preamble transmission when no other wireless devices are determined to be in a vicinity of the wireless device.

42. The apparatus as defined in claim 39, wherein the processor is configured to set the idle mode duty cycle to a value greater than a minimal duty cycle value and less than an active idle mode duty cycle value when the at least another wireless device operating in the idle mode is determined to be in the vicinity of the wireless device.

43. The apparatus as defined in claim 39, wherein the processor is configured to set the idle mode duty cycle to an active idle mode duty cycle when the at least another wireless device operating in the active mode is determined to be in the vicinity of the wireless device.

44. The apparatus as defined in claim 43, wherein the value of the active idle mode duty cycle is variably determined in the wireless device based on whether the at least another wireless device operating in the active mode is currently connected to the wireless device.

45. An apparatus for controlling an idle mode in a wireless device, the apparatus comprising:
at least one processor configured to:
determine neighborhood conditions of the wireless device, which includes determining presence and states of other wireless devices in the neighborhood of the wireless device; and
adaptively set an idle mode duty cycle used for at least preamble transmission by the wireless device responsive to the determined neighborhood conditions;
a memory configured to store instructions executable by the at least one processor; and a receiver configured to receive a preamble transmission from another neighboring wireless device that includes a distance value configured to communicate distance information to at least one neighboring serving wireless device having one of an active wireless device and an idle wireless device operating in a coverage area of the neighboring serving wireless device, wherein the processor is further configured to adaptively set the idle mode duty cycle based on the received distance value.

46. The apparatus as defined in claim 45, wherein the processor is further configured to:

increment the received distance value by a predetermined amount when no active wireless device is present in a coverage area of the wireless device; and direct transmission of the incremented distance value by a transmitter to at least one further neighboring wireless device.

47. The apparatus as defined in claim 39, wherein the processor is further configured to direct alternating transmission of the preamble transmission by a transmitter in the wireless device and reception of preamble transmissions by a receiver in the wireless device from at least one neighboring wireless device during respective idle mode cycles.

48. The apparatus as defined in claim 39, wherein the processor is further configured to direct transmission of the preamble transmission by a transmitter in one or more particular time slots of a wireless transmission frame.

49. An apparatus for controlling an idle mode in a wireless device, the apparatus comprising:

at least one processor configured to:

determine neighborhood conditions of the wireless device, which includes determining presence and states of other wireless devices in the neighborhood of the wireless device;

adaptively set an idle mode duty cycle used for at least preamble transmission by the wireless device responsive to the determined neighborhood conditions;

detect timing information from at least one preamble transmission from at least one other wireless device;

determine an earliest system time from the timing information and a system time of the wireless device based on predetermined criteria; and slave the system time of the wireless device to the determined earliest system time; and a memory configured to store instructions executable by the at least one processor.

50. The apparatus as defined in claim 49, wherein the predetermined criteria includes giving priority to system times of another wireless device having active wireless devices in its vicinity over system times of another wireless device having idle wireless devices in its vicinity.

51. An apparatus for controlling an idle mode in a wireless device, the apparatus comprising:

at least one processor configured to:

determine neighborhood conditions of the wireless device, which includes determining presence and states of other wireless devices in the neighborhood of the wireless device;

determine a distance from the wireless device to an idle access terminal registered in a network based on at least one distance value received from at least one neighboring wireless device;

determine a priority class of the access terminal; and adaptively set the idle mode duty cycle used for at least preamble transmission by the wireless device responsive to the determined neighborhood conditions and dependent on the determined distance and priority class; and a memory configured to store instructions executable by the at least one processor.

52. The apparatus as defined in claim 39, wherein the processor is further configured to direct transmission paging information within one of the preamble transmission and a dedicated paging channel to at least one neighboring unwired access point, wherein the paging information communicates paging information concerning at least one access terminal registered in a network.

53. The apparatus as defined in claim 39, wherein the processor is further configured to:

determine neighborhood conditions by determining the presence of at least one preamble demand signal from at least one neighboring wireless device; and adaptively set the idle mode duty cycle based on the at least one preamble demand signal.

54. The apparatus as defined in claim 53, wherein the processor is further configured to direct sending the preamble in response to the preamble demand signal.

55. A computer program product comprising:

a non-transitory computer-readable medium comprising:

code for causing a computer to determine neighborhood conditions of a wireless device, which includes determining presence and states of other wireless devices in the neighborhood of the wireless device and determining at least another wireless device operating in an active mode or an idle mode in a vicinity of the wireless device;

code for causing a computer to adaptively set an idle mode duty cycle used for at least preamble transmission by the wireless device responsive to the determined neighborhood conditions; and code for causing a computer to transmit the preamble transmission including a minimum distance value configured to communicate to at least one neighboring serving wireless device the presence of at the least another wireless device operating in the active mode or the idle mode in the vicinity of the wireless device.

56. The computer program product as defined in claim 55, wherein the code for causing a computer to adaptively set the idle mode duty cycle sets the idle mode duty cycle to a minimal duty cycle value still affording preamble transmission when no other wireless devices are determined to be in the vicinity of the wireless device.

57. The computer program product as defined in claim 55, wherein the code for causing a computer to adaptively set the idle mode duty cycle sets the idle mode duty cycle to a value greater than a minimal duty cycle value and less than an active idle mode duty cycle value when the at least another wireless device operating in the idle mode is determined to be in the vicinity of the wireless device.

58. The computer program product as defined in claim 55, the code for causing a computer to adaptively set the idle mode duty cycle sets the idle mode duty cycle to an active idle mode duty cycle when the at least another wireless device operating in the active mode is determined to be in the vicinity of the wireless device by the means for determining neighborhood conditions of the wireless device.

59. A computer program product comprising:

a non-transitory computer-readable medium comprising:

code for causing a computer to determine neighborhood conditions of a wireless device, which includes determining presence and states of other wireless devices in the neighborhood of the wireless device;

code for causing a computer to receive a preamble transmission from another neighboring wireless device that includes a distance value configured to communicate distance information to at least one neighboring serving wireless device having at least one of an active wireless device and an idle wireless device operating in a coverage area of the neighboring serving wireless device; and code for causing a computer to adaptively set an idle mode duty cycle used for at least preamble transmission by the wireless device responsive to the determined neighborhood conditions and based on the received distance value.

60. The computer program product as defined in claim 55, wherein the computer-readable medium further comprises:

code for causing a computer to cause transmission of the preamble transmission in one or more particular time slots of a wireless transmission frame.

61. A computer program product comprising:

a non-transitory computer-readable medium comprising:

code for causing a computer to determine neighborhood conditions of a wireless device, which includes determining presence and states of other wireless devices in the neighborhood of the wireless device;

code for causing a computer to determine a distance from the wireless device to an idle access terminal registered in a network based on at least one distance value received from at least one neighboring wireless device;

code for causing a computer to determine a priority class of the access terminal; and code for causing a computer to adaptively set an idle mode duty cycle used for at least preamble transmission by the wireless device responsive to the determined neighborhood conditions and dependent on the determined distance and priority class.

62. A computer program product comprising:

a non-transitory computer-readable medium comprising:

code for causing a computer to determine neighborhood conditions of the wireless device, which includes determining presence and states of other wireless devices in the neighborhood of the wireless device;

code for causing a computer to adaptively set an idle mode duty cycle used for at least preamble transmission by the wireless device responsive to the determined neighborhood conditions;

code for causing a computer to detect timing information from at least one preamble transmission from at least one other wireless device;

code for causing a computer to determine an earliest system time from the timing information and a system time of the wireless device based on predetermined criteria; and code for causing a computer to slave the system time of the wireless device to the determined earliest system time.

* * * * *